(12) United States Patent
Goldman

(10) Patent No.: US 7,137,002 B2
(45) Date of Patent: Nov. 14, 2006

(54) DIFFERENTIAL AUTHENTICATION ENTITY VALIDATION SCHEME FOR INTERNATIONAL EMERGENCY TELEPHONE SERVICE

(75) Inventor: Stuart O. Goldman, Scottsdale, AZ (US)

(73) Assignee: Lucent Technologies Inc., Murray Hill, NJ (US)

( * ) Notice: Subject to any disclaimer, the term of this patent is extended or adjusted under 35 U.S.C. 154(b) by 781 days.

(21) Appl. No.: 10/396,196

(22) Filed: Mar. 24, 2003

(65) Prior Publication Data

US 2004/0193886 A1    Sep. 30, 2004

(51) Int. Cl.
*H04L 9/00* (2006.01)
*H04L 9/32* (2006.01)

(52) U.S. Cl. .................. 713/170; 713/176; 726/2; 726/3; 726/4

(58) Field of Classification Search ........ 713/168–170, 713/176; 726/1–6; 709/223–225; 455/404.1, 455/410–411, 414.1
See application file for complete search history.

(56) References Cited

U.S. PATENT DOCUMENTS

| | | | |
|---|---|---|---|
| 6,426,955 B1 * | 7/2002 | Gossett Dalton et al. ... | 370/401 |
| 6,581,093 B1 * | 6/2003 | Verma ........................ | 709/220 |
| 6,842,449 B1 * | 1/2005 | Hardjono ................... | 370/352 |
| 6,857,075 B1 * | 2/2005 | Patel .......................... | 713/171 |
| 6,931,545 B1 * | 8/2005 | Ta et al. ...................... | 726/10 |
| 6,961,783 B1 * | 11/2005 | Cook et al. ................. | 709/245 |

* cited by examiner

*Primary Examiner*—Hosuk Song
(74) *Attorney, Agent, or Firm*—David J. Zwick; Steven R. Santema

(57) ABSTRACT

A network entry switch based statistical authenticating entity validation scheme wherein the level of IEPS call validation by authenticating entity is dependent on network load and the level of failed validations for a given authenticating entity.

12 Claims, 2 Drawing Sheets

DIFFERENTIAL AUTHENTICATION ENTITY VALIDATION SCHEME FOR INTERNATIONAL EMERGENCY TELEPHONE SERVICE

FIELD OF THE INVENTION

The present invention relates to authentication entity electronic signature validation of International Emergency Preference Scheme telecommunications for authorized users during public emergencies when attempting access to a Public Switched Telephone Network (PSTN).

BACKGROUND OF THE INVENTION

When disaster strikes, effective telecommunications for emergency response personnel involved in recovery efforts is essential. Since telecommunications capability can be severely affected due to excessive traffic in a disaster situation, loss of infrastructure, and potential denial of service attacks, certain schemes can be included in the telecommunications network to enable and facilitate emergency response communications.

One such scheme is the United States' Government Emergency Telephone Service (GETS). GETS is a set of switch-based and Advanced Intelligent Network (AIN) features which allow authorized users to gain access to enhanced call completion features, including Alternate Carrier Routing, High Probability of Completion (HPC), HPC Detection and SS7 IAM Message Priority, HPC Trunk Queuing, HPC Exemptions From Network Management Controls, Enhanced Alternate Carrier Routing, and Default Routing. To gain access to GETS, a user first dials an access number, then enters an authentication PIN, and then enters the desired destination number. GETS operates on the major long-distance carrier networks, most local networks, including wire-line, cellular and PCS systems, and government-leased networks such as the Federal Telecommunications System (FTS2000) and the Defense Information System Network (DISN). Thus, GETS access is available from most every telephone line in the country.

Other countries may have implemented such national telecommunications preference schemes to handle emergencies within their borders. However, some emergency situations require coordination on an international level. In these situations, communications may be required from a country that has not invoked a national preference scheme into a destination country that has. These communications may also transit through intermediate countries that may or may not have invoked their national preference schemes. Standards document International Telecommunications Union, Telecommunications Standardizations Sector (ITU-T) Recommendation E.106, "Description of an International Emergency Preference Scheme (IEPS)", March, 2000, which is hereby incorporated by reference, describes an interoperability scheme to allow communications between the essential users in one country and their correspondents in another during a crisis.

In addition to same or similar features as those in GETS to enhance call completion, another key aspect of IEPS is end-to-end call marking such that IEPS calls are recognized as such and afforded preference in the network even as the calls traverse national boundaries.

In the current trust model, it is assumed that IEPS authentication will take place at the national level where the call is placed and no more authentication, such as at subsequent national network entry switches, is needed. However, this may not be the case. For example, hostile groups in foreign countries or even hostile foreign governments may try to disrupt emergency telephone service in a destination country experiencing a disaster by overloading the emergency telephone service in the destination country. This could be accomplished, for example, by hacking into the originating country's telecommunications network through physical access to an SS7 cable or via a packet protocol and an IP gateway, and flooding the destination country's network with bogus IEPS calls. This is akin to a denial of service attack on the Internet.

The latest working draft of E.106 (Apr. 28, 2003) recommends authenticating entity electronic signature validation as a means to thwart such a denial of service attack. The recommendation suggests that the originating network include in the call establishment messages all necessary information so that the intermediate and terminating networks may validate the call and decide on the appropriate level of preferential treatment without the need to query the originating network. The necessary information would include authenticating entity identity and an electronic signature of the authenticating entity. Each IEPS call could be validated at the network entry of each national boundary traversed between the originating and destination networks.

Authenticating entity identities could be, for example, each country's government agency charged with the authentication of national emergency service calls. Other authenticating entities could, for example, be international agencies such as the International Red Cross should they choose to offer the service to their agents and are doing an authentication process. The inclusion of authenticating entity identity allows other national networks to quickly determine if there is an arrangement to handle such calls, from that entity as preference calls. It is estimated that the creation of only a few hundred such IEPS authenticating entities should suffice for the worldwide international telecommunications network.

The electronic signature of the authenticating entity would be used to confirm the identity of the authenticating entity without further queries back to the originating network. Since electronic signature technology is evolving, it has been proposed that the initial message also include a field identifying the type of electronic signature being used so that more sophisticated signatures can be introduced over time should they become needed. It is envisioned that a public key/private key pair be used and that a time stamp be included in the key so that spoofing attempts with an intercepted key would not be successful.

Network entry switches (or a designated switch/switches or element/elements in the network) would perform or coordinate an authenticating entity validation function for each IEPS call and either grant or deny preferential treatment to the call based on the policy to be followed toward the originating network authenticating entity. However, the validation schemes used to validate the electronic signatures can be quite processor intensive. IEPS call volumes tend to be heaviest when there is an emergency, and this is the very time that the receiving networks may be in significant overload because of non-IEPS calls occurring related to the emergency. While it would be tempting to skip the validation process during periods of massive overload, this would leave the receiving networks open to denial of service attacks. Such an attack could flood the receiving network's remaining limited capacity and could cause valid IEPS calls to fail.

Denial of service attacks could also come from a hostile government. In this case, the authenticating entity and the electronic signature may both be valid, but the volume of IEPS calls originating from the hostile government would be well beyond any measure of reasonableness and be intended to interfere with legitimate emergency recovery communications rather than to assist with recovery.

SUMMARY OF THE INVENTION

Accordingly, it is an object of the present invention to provide an IEPS authenticating entity identity validation scheme that will use the least amount of processor resources necessary to validate IEPS calls.

Another object of the present invention is to provide a scheme with the capability to reject all IEPS calls based on a particular authenticating entity.

The present invention is a statistical authenticating entity identity validation scheme at a network entry switch wherein the percentage of IEPS call validations performed by authenticating entity is dependent on network load and the level of previously failed validations for a given authenticating entity. If the network load is light, then no validation need be done. At some network load threshold level, validation is done on a sampling basis per authenticating entity. If a high level of validations fail for a given authenticating entity, the level of validations is incrementally increased for the entity, and may increase to a 100% level. Also, if a particular authenticating entity is flooding the network with IEPS calls and a denial of service attack is suspected, all IEPS calls originating from that entity can be marked as blocked or, alternatively, marked as ordinary calls and allowed to compete for resources with the other ordinary calls, without adversely impacting IEPS calls originating from other entities.

DESCRIPTION OF THE PREFERRED EMBODIMENT

Figure 1:
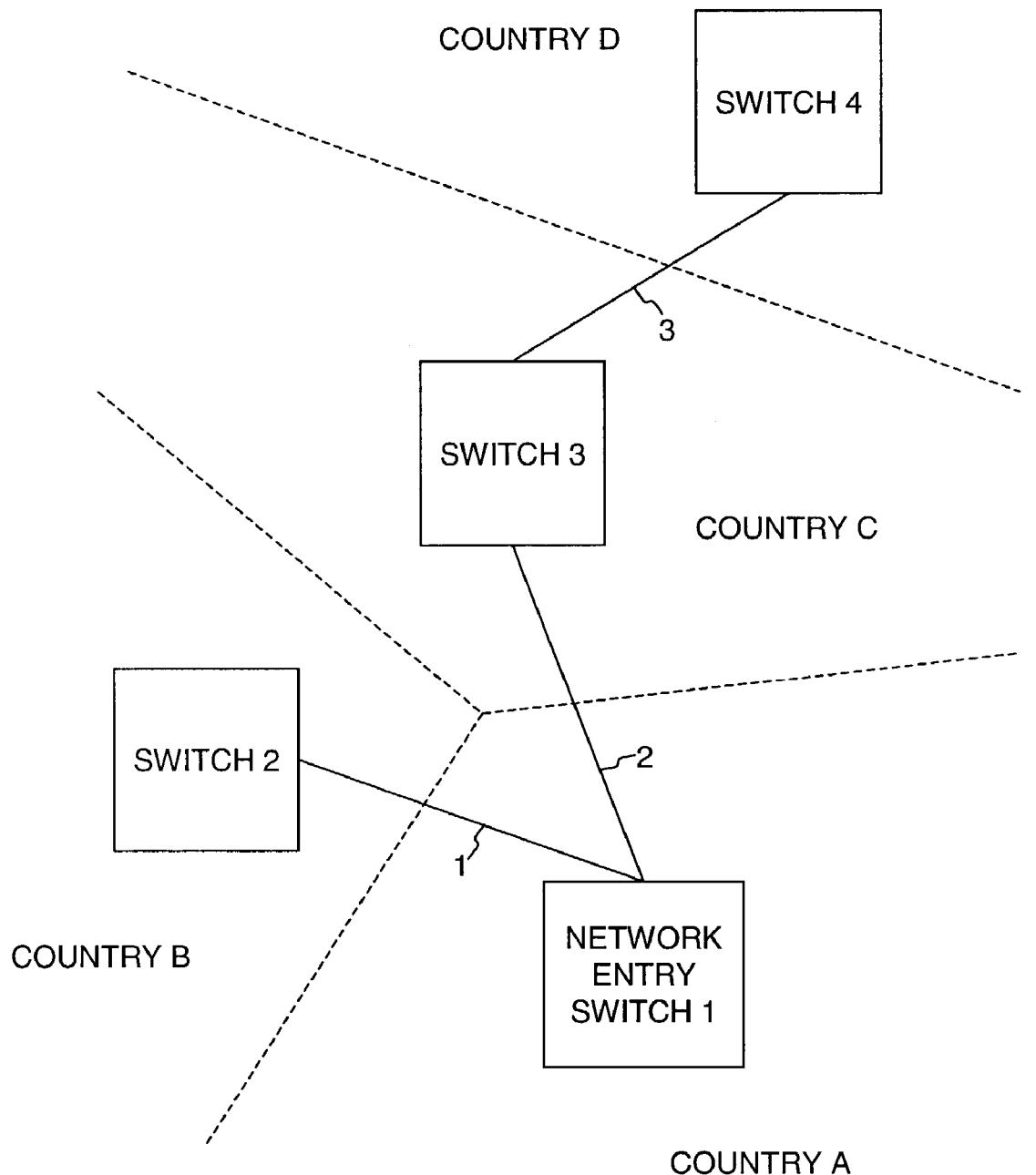
FIG. 1 shows a block diagram of a telecommunications network in which the preferred embodiment of the present invention would operate.

FIG. 1 shows a block diagram of an international telecommunications network in which the preferred embodiment of the present invention would operate. Network Entry Switch 1 is located in country A, Switch 2 is located in country B, Switch 3 is located in Country C, and Switch 4 is located in Country D. Although not shown, Network Entry Switch 1, Switch 2, Switch 3 and Switch 4 are further connected to the national telecommunications networks of their respective countries.

The international telecommunications network of FIG. 1 in which the present invention resides will support suitable signaling protocols that include information elements transmitted during call setup capable of at least carrying IEPS authentication entity identity and electronic signature. In the preferred embodiment, the signaling protocol is a possibly modified Signalling System 7 (SS7), as described in standards publication ANSI T1.110-1992, "Signalling System No. 7 (SS7)—General Information," American National Standards Institute, 1992, and the other standards in this series, ANSI T1.114-1996, ANSI T1.112-1996, ANSI T1.113-1995, ANSI T1.114-1996, and ANSI T1.116-1996.

The modifications to SS7 would include, for example, including in the IAM message record IEPS authentication entity identity and electronic signature. Each network entry switch in the international network would include a list of authenticating entities and associated electronic signature information.

In the preferred embodiment, Network Entry Switch 1, Switch 2, Switch 3 and Switch 4 are interconnected over regular PSTN trunks 1, 2, and 3, which can comprise, for example, T1 trunks, channel banks, four-wire E&M, or two-wire connections. Although shown as direct connections for purposes of illustration, these connections typically include other network elements including signal transfer points, signal switching points, access tandems and other tandem switches, over various digital or analog transmission media including copper, fiber, and through-the-air.

The present invention is a differential authenticating entity electronic signature validation scheme at Network Entry Switch 1 for IEPS calls wherein the level of validation for incoming IEPS calls from Switch 2, Switch 3 and Switch 4 is dependent on the network load, as seen by Network Entry Switch 1, of the national network of country A, and the level of previously failed validations for a given authenticating entity. If the network load of the national network of country A is light, then no validation need be done. At some network load threshold level, electronic signature validation begins on a sampling basis per authenticating entity. If a high level of validations fail for a given authenticating entity, the sampling level of validations is incrementally increased for the entity, and may increase to a 100% level. Also, if a particular authenticating entity is flooding the network with IEPS calls and a denial of service attack is suspected, all IEPS calls originating or appearing to originate from that entity can be marked as blocked or, alternatively, marked as ordinary calls and allowed to compete for resources with the other ordinary calls, for a certain amount of time without adversely impacting IEPS calls from other entities.

Several illustrative examples of how the present invention would operate in the international network of FIG. 1 follow.

In a first case, Network Entry Switch 1 receives, over a short period of time, a modest number of requests for IEPS calls from Switches 2, 3 and/or 4. Network Entry Switch 1 is not in an overload state. The differential authenticating entity electronic signature validation scheme at Network Entry Switch 1 does not validate any of the IEPS requests and grants IEPS preference to each IEPS call request based on the historic trust model relation between the networks.

In a second case, Network Entry Switch 1 receives, over a short period of time, a very high number of requests for IEPS calls from Switches 2, 3 and/or 4. Network Entry Switch 1 is not in an overload state. The differential authenticating entity electronic signature validation scheme at Network Entry Switch 1 validates the electronic signatures of a sampling of incoming IEPS calls at the base rate of, for example 1 in 100 IEPS requests by authenticating entity, in order to establish the percentage of bogus IEPS requests by authenticating entity. During validation sampling, the requests from a certain authenticating entity are failing validation above a certain threshold rate. The sampling rate for that authenticating entity is increased from 1 in 100 to 2 in 100, and the sampling rate for all other authenticating entities remains unchanged at 1 in 100. If IEPS requests from the authenticating entity begin to fail validation at a higher rate, the sampling rate for the authenticating entity could be incrementally increased, for example by a certain percentage or multiplying factor, until a 100% validation sampling rate is reached. If IEPS requests from the authenticating entity fail validation at a lower rate, the sampling rate for the authenticating entity could be incrementally decreased, for example by a certain percentage or multiplying factor, until the base sampling rate is reached.

In a slight change to the second case above, if Network Entry Switch 1 moves into an overload state, all or some of all current electronic signature validation sampling rates by entity, the base sampling rate, or the factors or percentages to increase or decrease sampling as the validation failure rate by entity increases or decreases, would be increased by, for example, certain percentages or multiplying factors.

In a third case, the premise is almost the same as in case two above, except that a high percentage of the received IEPS requests are from a certain authenticating entity and a very high percentage of them, above a certain threshold rate, are failing validation. A denial of service attack is suspected. The differential authenticating entity electronic signature validation scheme at Network Entry Switch 1 marks as blocked or, alternatively, marks as ordinary calls and allows to compete for resources with the other ordinary calls, all IEPS call requests from that authenticating entity for a certain period of time, for example 15 minutes. At the end of the period, all differential authenticating entity validation scheme counters for the authenticating entity are reset and validation for the authenticating entity starts anew. If a denial of service pattern is again detected for this authenticating entity, then call requests will again be marked as blocked or as ordinary calls.

In a fourth case, the premise is almost the same as in case three above, except that all IEPS requests pass validation. Because of the unusually high number of requests coming from a single authenticating entity, a denial of service attack is suspected, even though all IEPS requests appear to be valid. As in case three, the differential authenticating entity electronic signature validation scheme at Network Entry Switch 1 marks as blocked or, alternatively, marks as ordinary calls and allows to compete for resources with the other ordinary calls, all IEPS call requests from the authenticating entity for a certain period of time, for example 15 minutes. At the end of the period, all differential call validation scheme counters for the authenticating entity are reset and validation for the authenticating entity starts anew. If a denial of service pattern is again detected for this authenticating entity, then call requests will again be marked as blocked or as ordinary calls.

In all of the above illustrative cases, if the sampling rate for a given authenticating entity has increased above the base sampling rate due to an elevated validation failure rate, then if the validation failure rate significantly declines, the sampling rate would also decline back to the base sampling rate for the given network conditions. Thus, while an anomaly might initially appear to be a denial of service attack and cause the sampling rates to increase, if the anomaly disappears, the sampling rates would drop back to default values.

Figure 2:
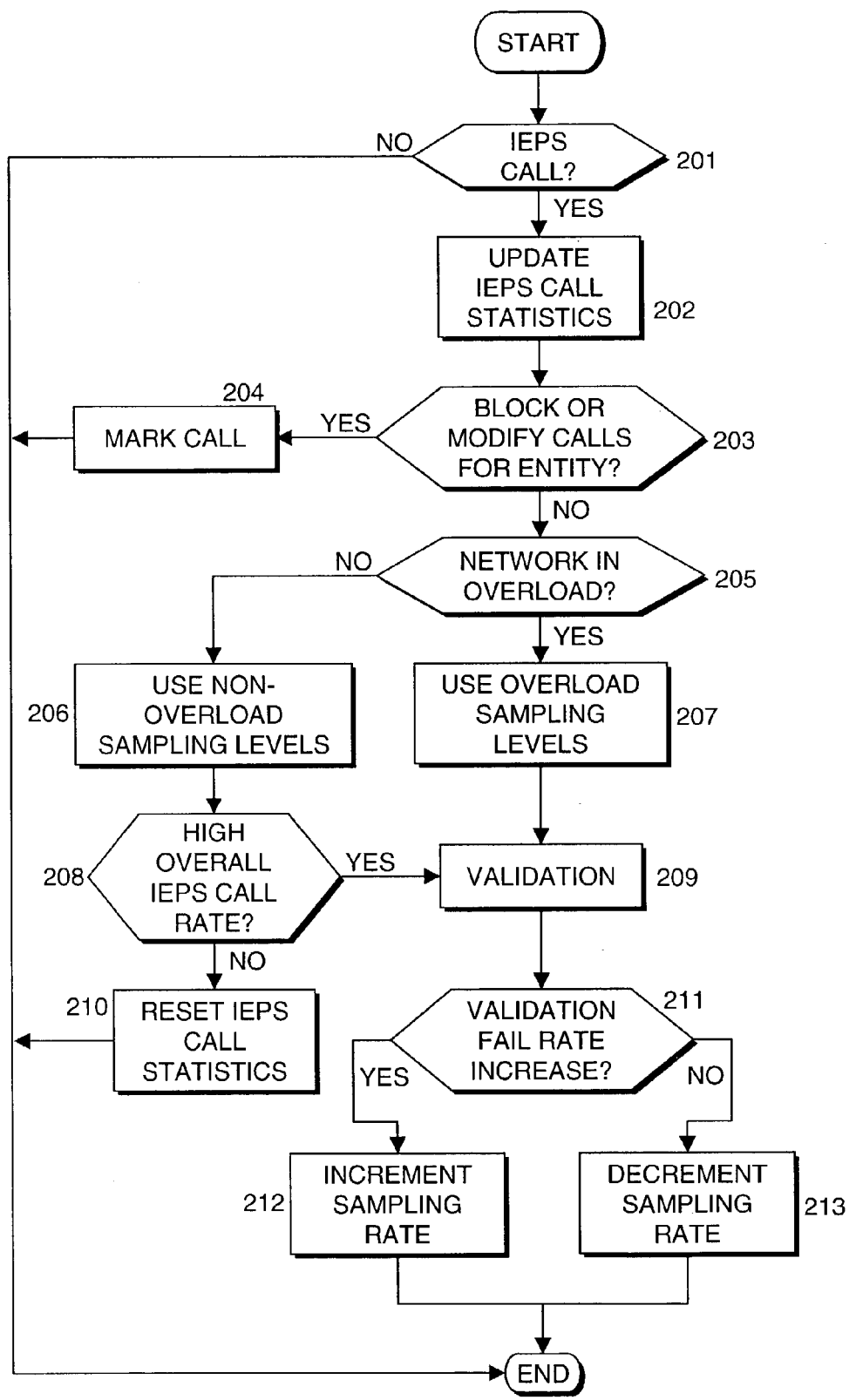
FIG. 2 shows a flow chart for a preferred embodiment of the authenticating entity electronic signature validation logic of the present invention.

FIG. 2 shows a flow chart for a preferred embodiment of the authenticating entity electronic signature validation logic of the present invention.

At 201, the incoming call is checked to see if it is an IEPS call. If the incoming call is not an IEPS call, no further validation logic is performed.

At 202, if the call is an IEPS call, overall and by entity IEPS statistical call information is updated.

At 203, all calls for a given authenticating entity will be marked as blocked or ordinary calls if there is a high validation failure rate, or there is an exceptionally high IEPS call rate from the entity, with or without a high validation failure rate. Calls may be marked as blocked or ordinary for, for example, 15 minutes, after which all counts and rates for the authenticating entity would be reset and the validation logic would begin anew. If all calls for a given authenticating entity are currently blocked or to be converted to ordinary calls, then at 204 the call is marked and no further validation logic is performed. Also, if there is an indication associated with the list of authenticating entities that IEPS calls from this entity will not be honored, then the call is marked and no further validation logic is performed. It is recognized that a hostile group or government may "hijack" an authenticating entity identity for use during a denial of service attack, and this may cause legitimate IEPS calls from the entity to be denied.

At 205, if Network Entry Switch 1 is in an overload state, then at 207, if it hasn't been done already, all or some of all current sampling rates by entity, the base sampling rate, or the factors or percentages to increase or decrease sampling as the validation failure rate by entity increases or decreases, would be increased by certain percentages or multiplying factors.

At 209, the authenticating entity electronic signature is validated.

At 205, if Network Entry Switch 1 is not in an overload state, then at 206, if it hasn't been done already, the adjustments that occurred at 207 are reversed. This reversal of adjustments does not necessarily have to use the same adjustment increments as was used at 207. The reversal increments can be larger or smaller than those used at 207.

At 208, if there is a high overall rate of incoming IEPS calls, then at 209, the authenticating entity electronic signature is validated.

If at 208, there is not a high overall rate of incoming IEPS calls, then at 210, all IEPS statistics are reset and no further validation logic is performed.

At 211, if the IEPS call validation failure rate for a certain authenticating entity significantly increases, then at 212, the sampling rate for the entity is incremented. The sampling rate could be repeatedly incremented to a system maximum of, for example, 100%.

At 211, if the IEPS call validation failure rate for a certain authenticating entity significantly decreases, then at 213, the sampling rate for the authenticating entity is decremented. The sampling rate could be repeatedly decremented to the system minimum for the load condition Network Entry Switch 1 is currently experiencing.

It will be apparent to those skilled in the art that the logic presented in FIG. 2 is just one of many methods of processing the incoming IEPS calls. How the logic is processed is a design decision dependent on technology, local, national and international standards, and other technological and economical considerations.

Generally, in the preferred embodiment of the present invention, the differential authenticating entity electronic signature validation scheme at Network Entry Switch 1 would include the following elements:

A list of IEPS authenticating entities and how Network Entry Switch 1 honors IEPS requests from these entities. The list could be, for example, a full list of all IEPS authenticating entities with a simple indicator for each entity that incoming IEPS requests will or will not be honored, or a list containing only those entities whose IEPS requests will be honored. The list could include indications of how a call is to be marked if it is not to be honored or fails validation.

For example, the list could indicate that the call should be marked as blocked, should be modified to be a regular call, or some other call handling;

Electronic signature information for authenticating entities to support authenticating entity validation. The electronic signature should be such that it is not easily spoofed should it be intercepted. The electronic signature could include, for example, a public key/private key encryption pair and a time stamp included in the key so that spoofing attempts with an intercepted key would not be successful;

A signaling protocol that allows IEPS authenticating entity identity and IEPS authenticating entity electronic signature to be transmitted during the call setup portion of signaling, call marking so that an IEPS call is recognized as such, and an indicator that an IEPS call should be dropped;

Switch load information at Network Entry Switch 1 to indicate when the switch (or the network) is in an overload state. Since the switch may move in and out of overload, the switch, for purposes of the present invention, could be considered in an overload state if, for example, at anytime during the previous 15 minutes the switch experienced an overload condition;

Resettable timers, counters and registers to determine by IEPS authenticating entity and overall, the rate or percentage of authenticating entity validation failures. Also, timers to determine how long all IEPS requests from a given authenticating entity have been denied or converted to normal calls due to a suspected denial of service attack;

Values used to increment and decrement the per entity sampling rates based on the rate of per entity validation failures, and to increment and decrement the per entity sampling rates based on switch or network load;

Threshold values for the rates of per entity validation failures, and overall IEPS calls received. These threshold values would be used to determine when sampling should begin and when it should end for authenticating entities based on validation failure rate, when sampling should be increased and decreased for entities that are experiencing validation failures, when IEPS requests from entities should be denied due to a suspected denial of service attack, and when the overall rate of IEPS calls warrants entity validation;

A suitable sampling scheme for authenticating entity electronic signature validation making use of the resettable timers, counters and registers, the increment and decrement values, and the threshold values. In the preferred embodiment, a very simple sampling scheme can be used. For example, a percentage based scheme can be used where IEPS call counters roll over at 100, and the first certain number of each 100 calls is sampled. I.e., if sampling at a two percent rate is desired, then the first two calls of each 100 received by the switch are sampled. However, any suitable sampling scheme should work. The scheme should have a default base level of sampling, which could be adjusted based, for example, on network load or authenticating entity validation history. If the validation failure rate for a given authenticating entity rises above a threshold value, the sampling rate for this entity should be increased. As the failure rate increases, the sampling rate could increase in one or more increments up to some maximum sampling rate, which could be 100%. If the high validation failure rate for the given entity is transient or an anomaly, then the sampling rate for the entity should be decreased in one or more increments to the default base level sampling rate. Generally speaking, the sampling rate can go from zero to 100 percent;

Operational logic on Network Entry Switch 1 associated with incoming IEPS call processing to track overall and by entity validation failure rates, to compare failure rates against threshold values, and to take appropriate action regarding validation sampling rates and IEPS request denial or modification.

While the present invention has been shown and described with respect to a preferred embodiment, it will be understood by those skilled in the art that modifications may be made thereto without departing from the scope and spirit of the invention.

For example, Network Entry Switch 1 generally refers to functionality located somewhere in the network. This functionality may be located anywhere in the network, and may be distributed in the network, and is not necessarily on the first switch that incoming international calls encounter as they enter country A. In the lexicon of the specification and claims, network entry switch refers to the location(s) in the network where this functionality resides.

In embodiments of the present invention, switch load and network load may be used interchangeably. In some networks, individual switches may receive information on network load in other parts of the network. Use of this information if available and/or use of strictly switch load information is a design choice. In the lexicon of the claims, network load refers to whichever design choice has been made.

While the preferred embodiment shows Network Entry Switch 1 located in final destination country A, Network Entry Switch 1 may be located in an intermediate country en route to a final destination country. The differential authenticating entity validation scheme of the present invention would operate the same way on intermediate switches as on the destination switch.

While the preferred embodiment shows a network supporting the SS7 signaling protocol, any suitable signaling protocol will work. The protocol should support transmission of IEPS authentication entity and electronic signature in the call setup signaling.

In an alternative embodiment of the present invention, the sub-process of blocking or converting calls to ordinary calls (steps 203 and 204 described above) is optional.

It is intended that the scope of the invention be defined by the claims appended hereto and their equivalents.

What is claimed is:

1. A system for validating International Emergency Preference Scheme (IEPS) authenticating entity electronic signatures in incoming IEPS calls on a network entry switch in an international telecommunications network, said network including signaling protocols that allow transmission of IEPS authenticating entity identity and IEPS authenticating entity electronic signature to said switch during call setup, said switch able to determine network load of its national network, said system comprising:
   a list of IEPS authenticating entities and associated electronic signature information;
   a rule set for determining whether IEPS calls from authenticating entities in said list and not in said list will be marked or validated when received by said switch, and how marked upon failing validation;
   authenticating entity electronic signature validation logic for validating incoming IEPS calls using said associated electronic signature information;
   a sampling scheme for sampling incoming IEPS calls at a desired per entity sampling rate;

values by which to increment and decrement per entity sampling rates based on the per entity validation failure rates and network load;

said network entry switch operated to:

mark or validate incoming IEPS calls on a per entity basis based on said rule set;

validate incoming IEPS calls based on overall rate of incoming IEPS calls received;

validate a sampling of incoming IEPS calls using said electronic signature validation logic and mark calls upon validation failure based on said rule set; and increment and decrement per entity validation sampling rates by said values based on per entity validation failure rates and network load.

2. A system according to claim 1, wherein said network entry switch is further operated to mark, based on said rule set, all IEPS calls from an entity if said entity is experiencing a high validation failure rate.

3. A system according to claim 2 wherein said marking is for a specific time interval.

4. A system according to claim 1, wherein said network entry switch is further operated to mark, based on said rule set, all IEPS calls from an entity if said entity is transmitting a high rate of IEPS calls.

5. A system according to claim 4 wherein said marking is for a specific time interval.

6. A system according to claim 1, wherein said sampling scheme comprises sampling the first certain number of each 100 IEPS calls received such that the desired sampling rate is achieved.

7. A method for validating International Emergency Preference Scheme (IEPS) authenticating entity electronic signatures in incoming IEPS calls on a network entry switch in an international telecommunications network, said network including signaling protocols that allow transmission of IEPS authenticating entity identity and IEPS authenticating entity electronic signature to said switch during call setup, said switch able to determine network load of its national network, said switch comprising a list of IEPS authenticating entities and associated electronic signature information and a rule set for determining whether IEPS calls from authenticating entities in said list and not in said list will be marked or validated when received by said switch, and how marked upon failing validation, said method comprising:

marking or validating incoming IEPS calls on a per entity basis based on said rule set;

validating a sampling of incoming IEPS calls using electronic signature validation logic;

marking calls upon validation failure based on said rule set;

wherein said sampling is at a per entity rate that is based on overall rate of incoming IEPS calls received, per entity validation failure rates and network load, and said per entity sampling rate can be incremented and decremented based on changes in overall rate of incoming IEPS calls received, per entity validation failure rates and network load.

8. A method according to claim 7, further comprising marking, based on said rule set, all IEPS calls from an entity if said entity is experiencing a high validation failure rate.

9. A method according to claim 8 wherein said marking is for a specific time interval.

10. A method according to claim 7, further comprising marking, based on said rule set, all IEPS calls from an entity if said entity is transmitting a high rate of IEPS calls.

11. A method according to claim 10 wherein said marking is for a specific time interval.

12. A method according to claim 7, wherein said sampling comprises sampling the first certain number of each 100 IEPS calls received such that the desired sampling rate is achieved.

* * * * *